UNITED STATES PATENT OFFICE 2,680,088

ANTIMYCOTIC COMPOSITIONS

Laszlo Reiner, Bloomfield, N. J., assignor to Wallace & Tiernan Company, Inc., a corporation of New Jersey No Drawing. Application March 12, 1949,
Serial No. 81,215

3 Claims. (Cl. 167—58)

In the treatment of fungus infections of the human skin, i. e. infections of the glabrous skin and of the hairy areas of the skin, considerable advance has been made in recent years through the discovery of a number of antimycotic compositions, notable instances of active ingredients in such preparations being certain fatty acids and their water insoluble salts. One such composition, for example, which has been extensively and successfully used in both ointment and powder form for treating many so-called superficial fungus infections, has contained, as active ingredients, zinc undecylenate and undecylenic acid or a soluble salt of the latter. Special advantages of such preparations have been that they are well tolerated by the skin, that they do not irritate and that they thereby aid the skin in liberating itself of the fungi.

These relatively mild antimycotic agents, especially the higher fatty acids and their insoluble salts (such reference including the olefinic acids having from 6 to 12 carbon atoms, as represented by undecylenic acid and zinc undecylenate), have fallen short of complete or uniform success in certain resistant types of infection of the glabrous skin and especially in infections of the hairy skin caused by *Microsporon audouini*. On the other hand, relatively strong fungicidal agents have often been unsatisfactory or poorly effective, for example because the agent is excessively irritating and cannot be applied in a sufficiently high concentration, or because (in many instances) the physical properties of the agent are such that a large enough proportion of it cannot be incorporated in a suitable pharmaceutical preparation such as an ointment base. Accordingly there has remained a need for a chemo-therapeutic agent of improved characteristics for the treatment of tinea capitis and the like especially as caused by *M. audouini* as well as by other organisms such as *M. lanosum*, the need thus being for a better alternative to the process of X-ray epilation which requires costly equipment and highly specialized training for the practitioner.

The present invention embraces the discovery that by combining substances of the two types, specifically by using a small proportion of a strong fungicide such as salicylanilide together with a mild and less vigorous agent such as the fatty acids and their insoluble salts, of which category zinc undecylenate is a peculiarly useful and beneficial representative, a composition is produced that is considerably more effective than either constituent can be alone (even when used in larger quantity or concentration) and that has in fact evidenced a greater activity than would be expected on the assumption that the effects of the two ingredients would be truly additive. Since additivity of effect, and even compatibility in association or in use, are essentially non-predictable in chemotherapeutic work against specific disorders or specific organisms, the improved results of the present discovery are significant to an unusual degree, a further and specific advantage of the combination being found to reside in its adaptability to admixture with a carrier, such as an ointment base, which not only provides a stable and uniform suspension of the ingredients but appears to effect a more lasting, more penetrating and more uniform distribution of one or both of them on the skin than can be otherwise achieved.

A specific and peculiarly important combination in accordance with the invention is realized in a composition, such as an ointment, containing salicylanilide, in the proportion of a few per cent, and a somewhat larger amount of zinc undecylenate, presently preferred examples of such composition also including a minor quantity of undecylenic acid, and the whole being suitably associated with a carrier, e. g. an ointment base. In every instance studied, i. e. of combinations according to the invention, of which the composition just specified is representative, fungicidal or fungistatic tests made in vitro showed superior activity of the combination over the individual ingredients in the same concentrations, and to a considerable extent showed that such activity was even greater than an additive effect. For example, not only was positive activity exhibited by a combination of ingredients each present in a concentration which alone would be less than effectively active, but where the concentration of each was such that it would reveal moderate activity by itself, the measured effect of the combination of two types of ingredients was often greater than that attainable, say, upon increasing either (when used alone) by an amount representative of the additive effect of the other in accordance with the mathematical functions relating increase of activity of each to increase in its concentration.

The improvement afforded by combinations in accordance with the invention has been demonstrated to a more striking extent by clinical investigation. Suitably controlled clinical use of the composition on large numbers of patients, e. g. simply as an ointment topically applied at daily or like intervals convenient for practical use, has shown that infections on the scalp caused by M. audouini responded in a higher percentage of cases, and more rapidly, to the combination than to either of the ingredients used alone. That is to say, the over-all percentage of cures was substantially larger, and the rate of cure or response was substantially more rapid, to the extent of demonstrating in this two-fold manner the greater effectiveness of the new composition.

It will be appreciated that tinea capitis caused by the named organism, and occurring predominantly in children, has been found peculiarly refractory, sometimes requiring many months of treatment with previously suggested agents, and even then being scarcely controlled, in a number of cases, beyond the subsidence of infection which may naturally occur at the onset of adolescence. Hence the response reported in clinical use of the present composition, e. g. substantial recovery often in a matter of weeks or so for a large proportion of cases, is significant of new effects or mechanisms of antagonism to the fungi. While theoretical explanations are herein to be understood as presented for illustration rather than limitation of the invention, evidence of the clinical tests leads to the belief that the combination produces a specific and mild inflammatory reaction in the scalp which aids the penetration of active ingredients and is usually followed by rapid cure. There is considerable support for the hypothesis or understanding that the composition or an active part of it enhances the antigenicity of M. audouini in a heretofore unknown fashion. Some such effect may be produced as has been noted in another and very different field of chemotherapy, viz. in the case of certain mycobacteria such as Mycobacterium tuberculosis, where a specific inflammatory reaction and subsequent immunity can be produced and the antigenicity of the dead organisms has been found to be enhanced by the addition of certain chemicals (wholly different, of course, from those to which the present invention relates).

Whether the present composition actually increases such antigenic effect as may be exhibited in the case of M. audouini or whether the mechanism of the reaction is of some other sort, the clinical results have indicated the value of the composition, both in effectiveness and in avoidance of objectionable irritation and other unwanted side effects. Thus the peculiar utility in combining the described antimycotic agents in therapeutically and pharmaceutically balanced proportions to provide the properties just summarized has been well substantiated by extensive trials in the cases of human patients suffering from the named type of so-called ringworm of the scalp. It may be noted that the composition has been found effective against fungus infections at other parts of the body, particularly other areas of the hirsute skin, for example in cases of tinea barbae, and in these and other circumstances (including different types of tinea capitis) is active against other fungi such as Microsporon lanosum, and organisms of the Monilia and Trichophyton groups.

As stated, the improved results have been attained by employing a combination of two types of agents, viz. a powerful antimycotic substance of the type which may be considered as an anilide of a hydroxy derivative of benzoic acid, and a relatively mild agent constituted by a fatty acid or its insoluble salts. In a more specific and peculiarly preferred aspect, the invention involves preparations containing: (1) a small proportion, for example several per cent by weight (about 5% being specially advantageous, but useful results being attainable at least from, say 1% to 5% or perhaps slightly more) of a substance selected from the class consisting of anilides of monohydroxy benzoic acids, anilides of dihydroxy benzoic acids, and the substitution products of such compounds; and (2) a substantial proportion, usually larger (e. g. 5% to 25% by weight), of a material such as zinc undecylenate or aluminum undecylenate, further advantage being realized in many circumstances by constituting the second material as a mixture of the insoluble salt with a minor quantity, say a few percent, of a fatty acid itself. Special utility has been achieved with compositions wherein the first named ingredient is salicylanilide (for instance in the proportion of 5%), and likewise where the second material is a mixture of undecylenic acid and zinc undecylenate in proportions such as 2% of the acid and 25% of the salt, or 5% of the acid and 20% of the salt.

By way of further illustration, the following are specific examples of the manufacture of effective and pharmacologically satisfactory compositions embodying the improved combination. When made up as an ointment, it will be understood that the preparations may include (as noted in the examples) suitable ointment base materials, non-irritating and conveniently inert in essential respects, examples of such ingredients being carrier materials, solubilizing or emulsifying or other suspending agents, and wetting agents or the like to enhance penetration of the active ingredients, e. g. into the hair follicles. In compounding antimycotic preparations account may also be taken of any special requirements of the circumstances of use; for instance, there is evidence that alkaline or at least excessively alkaline conditions are favorable to the progress of infection caused by M. audouini and it has been recommended to avoid such conditions in treating infections caused by that organism.

*Example I*

45 pounds of Carbowax (polyethylene glycol of high molecular weight) and 22 pounds of polyethylene glycol of the molecular weight of approximately 300 are mixed at a suitable temperature, then 2 grams of "Tween" (polyoxyalkyl derivative of sorbitan monoleate) are added. To this mixture 25 pounds of zinc undecylenate, 2 pounds of undecylenic acid are first added; then the temperature is lowered and 5 pounds of salicylanilide are mixed in, allowed to cool and milled, to yield a smooth, uniform, stable and homogeneous ointment.

*Example II*

69 pounds of Carbowax 1500 are melted at a temperature of about 40° C., then mixed with 1 pound of polyethylene glycol monostearate; then a paste is made of 5 pounds of undecylenic acid and 20 pounds of zinc undecylenate which is added to the mixture of Carbowax and polyethylene glycol monostearate; the mixture is cooled to about 30° C. and 5 pounds of finely divided salicylanilide are added and mixed until it is uniform. The ointment is allowed to cool and is then milled.

*Example III*

An emulsion base is prepared by the use of 4.1 pounds of glyceryl monostearate, 11.6 pounds of glycerine, 3.5 pounds each of lanolin and petrolatum, 9.2 pounds cetyl alcohol; then 10 pounds of aluminum undecylenate are added which is mixed in thoroughly, finally 5 pounds of the anilide of gentisic acid are mixed in thoroughly and the ointment is milled, to the same effects of uniformity, stability and the like, as in the preceding examples.

Example IV

This is an instance of a composition prepared in the form of a liquid, embodying a combination of ingredients of the character more generally described herein. 2 pounds of salicylanilide are dissolved in a solution of 50 pounds of ethyl alcohol in which previously 5 pounds of undecylenic acid and 1 pound of triethanolamine had been dissolved. This solution is mixed slowly with a solution of 25 pounds of propylene glycol and 17 pounds of water. A pale reddish-brown solution results, which has a pH of approximately 7.

In various preparations, the quantities or concentrations of active ingredients may be changed within a reasonable range. Thus in compositions of the sort described in Example IV, the proportions of salicylanilide and undecylenic acid can be varied between, say, 0.5% to 5% for salicylanilide and 4% to 10% for undecylenic acid, provided that the proportions of ingredients (serving as carrier material) such as ethyl alcohol, propylene glycol and water are adjusted as required by the solubility of salicylanilide.

As indicated above, the essential combination is between salicylanilide or the like and another antimycotic ingredient represented by the undecylenates mentioned above. In a broader sense, and indeed as based upon a variety of tests, improved compositions are indicated where the second ingredient is defined as of the class of fatty acids and their water-insoluble salts, viz. such acids and salts having definite fungistatic or fungicidal activity, a number of fatty acids and salts thereof having such properties being known. It will be noted that the acid may be at least in part neutralized, if desired, so that such compound is actually present wholly or partly as a water-soluble salt, for example the sodium salt or the triethanolamine salt; it being preferable in this as in other cases to avoid having the pH much above 7. As indicated, zinc undecylenate is an exceptionally advantageous ingredient. Aluminum undecylenate is also specifically useful. Copper undecylenate has been employed heretofore for treatment of fungus infections (including tinea capitis caused by *M. audouini*), although with some relative disadvantage; in accordance with the principles now discovered, successful combinations including salicylanilide or the like and the copper compound may be made, but in results or other characteristics, the compositions containing the zinc salt (or the aluminum salt) are peculiarly preferred in the light of numerous tests and present clinical experience, the zinc salt appearing to have some unique advantage in the described preparations.

The proportions of ingredients may be varied as indicated, although it appears to be unexpectedly important to provide the above-described balance of the different types of active agents, e. g. a minor proportion of salicylanilide or other substance of the stated class, and a substantial and preferably relatively larger amount of the zinc salt or other material constituting the second ingredient. The compositions are adapted for administration in any of a variety of convenient ways, such as may be preferred by the medical profession; for instance, in cases of tinea capitis, the hair in the infected area may be kept closely clipped and the present ointment applied (and preferably rubbed in) at suitable, regular intervals, as the physician may prescribe.

It is to be understood that the invention is not limited to the specific compositions herein set forth but may be embodied in other forms without departure from its spirit.

I claim:

1. An antimycotic composition prepared for use as a pharmaceutical, containing as active ingredients, salicylanilide and zinc undecylenate in an amount by weight of at least as great as the amount of said salicylanilide by weight.

2. An antimycotic ointment, adapted for pharmaceutical use, containing as active ingredients not more than about 5% of salicylanilide, and water-insoluble undecylenate material comprising a mixture of a minor proportion of undecylenic acid and a major proportion of zinc undecylenate, said mixture comprising at least about 5% of the ointment, and said ointment including ointment base material in uniform mixture with said active ingredients.

3. An antimycotic composition, adapted for use as a pharmaceutical, containing as active ingredients, salicylanilide, and a compound containing the anion of undecylenic acid, said compound being present in an amount, by weight, equal to at least four-fifths of the amount of said salicylanilide by weight.

References Cited in the file of this patent

UNITED STATES PATENTS

| Number | Name | Date |
|---|---|---|
| 2,416,460 | Smith | Feb. 25, 1947 |

OTHER REFERENCES

Brain—British Medical Journal April 17, 1948, pp. 723–6.

Faley et al., J. A. Ph. A. Scient. Ed. 1946, pp. 198–202.

Schwartz, J. A. M. A. Sept. 14, 1946, pp. 58–61.